(12) United States Patent
Reisinger et al.

(10) Patent No.: US 11,375,337 B2
(45) Date of Patent: Jun. 28, 2022

(54) TRANSCEIVER DISTANCE MEASURING SYSTEMS

(71) Applicant: Continental Automotive GmbH, Hannover (DE)

(72) Inventors: Thomas Reisinger, Regenstauf (DE); Ulrich Emmerling, Kelheim (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 117 days.

(21) Appl. No.: 15/488,938

(22) Filed: Apr. 17, 2017

(65) Prior Publication Data
US 2017/0318423 A1    Nov. 2, 2017

(30) Foreign Application Priority Data

Apr. 27, 2016  (DE) .................... 10 2016 207 110.6

(51) Int. Cl.
*H04W 4/02* (2018.01)
*H04W 12/12* (2021.01)
*H04W 12/08* (2021.01)
*H04W 4/48* (2018.01)
*H04W 12/63* (2021.01)

(52) U.S. Cl.
CPC .......... *H04W 4/023* (2013.01); *H04W 12/08* (2013.01); *H04W 12/12* (2013.01); *H04W 4/48* (2018.02); *H04W 12/63* (2021.01)

(58) Field of Classification Search
CPC ....... H04W 4/023; H04W 40/38; H04W 4/02; H04W 12/12; H04W 4/48; H04W 12/63; H04W 12/06

USPC .......... 455/456.1–457; 340/435, 477, 686.6; 702/97, 149, 158
See application file for complete search history.

(56) References Cited

U.S. PATENT DOCUMENTS

| 5,715,017 | A | * | 2/1998 | Naito | ..................... | H04N 5/145 |
| | | | | | | 348/402.1 |
| 2002/0014990 | A1 | * | 2/2002 | Kimura | ................. | G01S 5/0072 |
| | | | | | | 342/458 |

(Continued)

FOREIGN PATENT DOCUMENTS

DE       102015216331 A1    3/2017   ............. G01S 11/02

OTHER PUBLICATIONS

Francillon, Aurelien et al., "Relay Attacks on Passive Keyless Entry and Start Systems in Modern Cars," In Proceedings of the 18th Annual Network and Distributed System Security Symposium. The Internet Society, URL: http://e-collection.library.ethz.ch/view/eth:4572, 15 pages.

(Continued)

*Primary Examiner* — Allahyar Kasraian
(74) *Attorney, Agent, or Firm* — Slayden Grubert Beard PLLC

(57) ABSTRACT

The present disclosure relates to transmitter and/or receiver units (transceivers), such as in particular motor vehicle transceivers. The teachings thereof may be embodied in methods and devices for detecting changes in the positions of transceivers relative to each other. For example, a system may include: a distance determining device to measure a current distance value corresponding to a respective distance of two of the transceivers relative to each other; and a comparator to compare the at least one current distance value and with a stored reference distance value.

11 Claims, 5 Drawing Sheets

(56) References Cited

U.S. PATENT DOCUMENTS

| | | | |
|---|---|---|---|
| 2004/0178883 A1* | 9/2004 | Haselsteiner | B60R 25/24 340/5.72 |
| 2005/0024181 A1* | 2/2005 | Hofbeck | B60R 25/02 340/5.7 |
| 2005/0201502 A1* | 9/2005 | Ruprich | H04B 1/7077 375/354 |
| 2014/0022052 A1* | 1/2014 | Lim | G08C 17/02 340/5.61 |
| 2014/0308971 A1* | 10/2014 | O'Brien | H04W 4/023 455/456.1 |
| 2014/0330449 A1 | 11/2014 | Oman et al. | 701/2 |
| 2014/0375420 A1* | 12/2014 | Seiberts | B60R 25/20 340/5.31 |
| 2015/0028995 A1* | 1/2015 | Gautama | B60R 25/406 340/5.72 |
| 2016/0039342 A1* | 2/2016 | Jones | B60R 1/00 348/148 |
| 2017/0063477 A1 | 3/2017 | Reisinger et al. | |

OTHER PUBLICATIONS

German Office Action, Application No. 102016207110.6, 5 pages.

* cited by examiner

TRANSCEIVER DISTANCE MEASURING SYSTEMS

CROSS-REFERENCE TO RELATED APPLICATIONS

This application claims priority to DE Application No. 10 2016 207 110.6 filed Apr. 27, 2016, the contents of which are hereby incorporated by reference in their entirety.

TECHNICAL FIELD

The present disclosure relates to transmitter and/or receiver units (transceivers), such as in particular motor vehicle transceivers. The teachings thereof may be embodied in methods and devices for detecting changes in the positions of transceivers relative to each other.

BACKGROUND

Radio keys are described in DE102015216331. A so-called "relay attack" is described in publication "PASS RAD: ETH Zürich: Paper "Relay Attack" http://e-collection.library.ethz.ch/view/eth:4572.

SUMMARY

Teachings of the present disclosure may be used to improve methods and devices for radio access to a function, in particular of a motor vehicle.

Some embodiments include devices for detecting (Cont) changes in the distances ($d_{ij,\ current}$; $t_{ij,\ current}$) of device transceivers (TRX1, TRX2, TRX3, TRX4, TRX5, TRX6) on a device (MV) relative to each other, in particular of distances ($d_{ij,\ current}$; $t_{ij,\ current}$) of device transceivers (TRX1, TRX2, TRX3, TRX4, TRX5, TRX6) on a motor vehicle (MV) relative to each other, with at least one distance determining device (Cont), which is designed to measure a current distance value ($d_{ij,\ current}$; $t_{ij,\ current}$) that represents the respective distance of two (i, j) of the device transceivers (TRX1, TRX2, TRX3, TRX4, TRX5, TRX6) relative to each other, and with a comparator (Cont) designed so as to compare the at least one current distance value ($d_{ij,\ current}$; $t_{ij,\ current}$) and at least one stored reference distance value ($d_{ij,\ ref}$; $t_{ij,\ ref}$).

In some embodiments, several current distance values ($d_{ij,\ current}$; $t_{ij,\ current}$) relating to distances between a respective two (i, j) of several device transceivers (TRX1, TRX2, TRX3, TRX4, TRX5, TRX6) of the device (MV) are measured.

In some embodiments, there is a comparator (Cont), which is designed to compare at least one measured current distance value ($d_{ij,\ current}$; $t_{ij,\ current}$) and at least one stored reference distance value ($d\text{-}_{ref}$; $t\text{-}_{ref}$) by comparing at least one correlation value (k) in the form of ($k=\Sigma_{i,j} v_{i,j}^2$) sum of squares of the differences for a respective current distance value ($d_{ij,\ current}$; $t_{ij,\ current}$) relative to a stored reference distance value ($d_{ij,\ ref}$; $t_{ij,\ ref}$), and/or one correlation value (k) that ($k=|\{v_{ij}|v_{ij}>s\}|$) indicates the number of times a threshold for the ratio is exceeded or the difference between a respective current distance value ($d_{ij,\ current}$; $t_{ij,\ current}$) and a stored reference distance value ($d_{ij,\ ref}$; $t_{ij,\ ref}$), and/or a correlation value (k)

$$k = \max_{i,j} v_{ij}$$

indicates the maximum number of times a threshold is exceeded for the ratio or the difference between a respective current distance value ($d_{ij,\ current}$; $t_{ij,\ current}$) and a stored reference distance value ($d_{ij,\ ref}$; $t_{ij,\ ref}$).

In some embodiments, one or several of the stored reference distance values ($d_{ij,\ ref}$; $t_{ij,\ ref}$) are reference distance values ($d_{ij,\ ref}$; $t_{ij,\ ref}$) stored during the production of the vehicle, and/or one or several of the stored reference distance values ($d_{ij,\ ref}$; $t_{ij,\ ref}$) are reference distance values ($d_{ij,\ ref}$; $t_{ij,\ ref}$) measured before the current current distance values ($d_{ij,\ current}$; $t_{ij,\ current}$).

In some embodiments, the at least one distance determining device is designed to measure a current distance value (d-current; t-current) representing the distance of two device transceivers relative to each other periodically and/or at prescribed times and/or when a prescribed situation is present, such as in particular an authentication test (Aut) and/or vehicle opening attempt (Act).

In some embodiments, the device is designed to measure one or several current distance values ($d_{ij,\ current}$; $t_{ij,\ current}$) while checking the authorization for opening (Dooropen) a vehicle door or trunk lid or for starting up a motor vehicle.

In some embodiments, the distance determining device (Cont) is a runtime determining device for determining the runtime, and wherein distance values (d-current; t-current) are runtime values (t-current, or wherein the distance values (d-current; t-current) are distance-indicating values (d-current).

In some embodiments, the device is designed to arrange and/or fasten the device transceivers (TRX1, TRX2, TRX3, TRX4, TRX5, TRX6) of the device (MV), in particular the motor vehicle transceivers (TRX1, TRX2, TRX3, TRX4, TRX5, TRX6) of the motor vehicle (MV), on the device (MV) or motor vehicle (MV) and/or design them as a single piece with the latter.

In some embodiments, there are distance determining devices in at least one device-external transceiver (Key-usr) and in at least one device transceiver (TRX1, TRX2, TRX3, TRX4, TRX5, TRX6) of the device (MV), which are each designed to measure a respective current distance value ($d_{KeyMV}$) representing a respective distance between at least one device-external transceiver (key-Usr) and one device-external transceiver (TRX1, TRX2, TRX3, TRX4, TRX5, TRX6) of the device (MV).

Some embodiments include methods for detecting (Cont) changes (FIG. 2, FIG. 3) in the distances ($d_{ij,\ current}$; $t_{ij,\ current}$) of device transceivers (TRX1, TRX2, TRX3, TRX4, TRX5, TRX6) of a device (MV) relative to each other, in particular of distances ($d_{ij,\ current}$; $t_{ij,\ current}$) of device transceivers (TRX1, TRX2, TRX3, TRX4, TRX5, TRX6) of a motor vehicle (MV) relative to each other, wherein at least one distance determining device is used to measure a current distance value ($d_{ij,\ current}$; $t_{ij,\ current}$) that represents the distance of two (i, j) of the device transceivers (TRX1, TRX2, TRX3, TRX4, TRX5, TRX6) relative to each other, and wherein a comparator (Cont) is used to compare the at least one current distance value ($d_{ij,\ current}$; $t_{ij,\ current}$) and at least one stored reference distance value ($d_{ij,\ ref}$; $t_{ij,\ ref}$).

BRIEF DESCRIPTION OF THE DRAWINGS

Additional features and advantages of several configurations of the present teachings may be gleaned from the following description of embodiments based on the drawings. Shown in a schematically simplified manner in order to illustrate several configurations.

DETAILED DESCRIPTION

Various embodiments may efficiently optimize a radio access function in particular of a motor vehicle. While the teachings can be implemented in particular in a motor vehicle, it is also suitable for other systems that determine distance values (distances and/or runtimes) and/or localization systems, e.g., for a localization system with fixed anchors, e.g., a lawnmower, for beacons, or for traffic signs.

In some embodiments, to elevate reliability, a measurement is performed on one or several distance values relating to distances between more than two transceivers. For example, a comparator can be used to compare the at least one current distance value and at least one stored (e.g., previously measured and/or stored) reference distance value by calculating at least the following (given a combination of two or three alternatives with potentially elevated reliability):

a correlation value in the form of the sum of squares of the differences between a respective current distance value and a stored reference distance value, and/or a correlation value that indicates how many times a threshold value is exceeded for the correlation or difference between a respective current distance value and a stored reference distance value, and/or a correlation value that indicates how many times a threshold value is exceeded for the correlation or difference between a respective current distance value and a stored reference distance value.

In some embodiments, reference distance values can be reference distance values created during vehicle production and/or reference distance values measured and/or stored earlier than the current distance values. For example, current distance values can be measured periodically and/or at prescribed times and/or given the presence of prescribed situations, such as in particular attempts to open the vehicle. Some embodiments can use distance values in the form of runtime values and/or distances.

Figure 1:
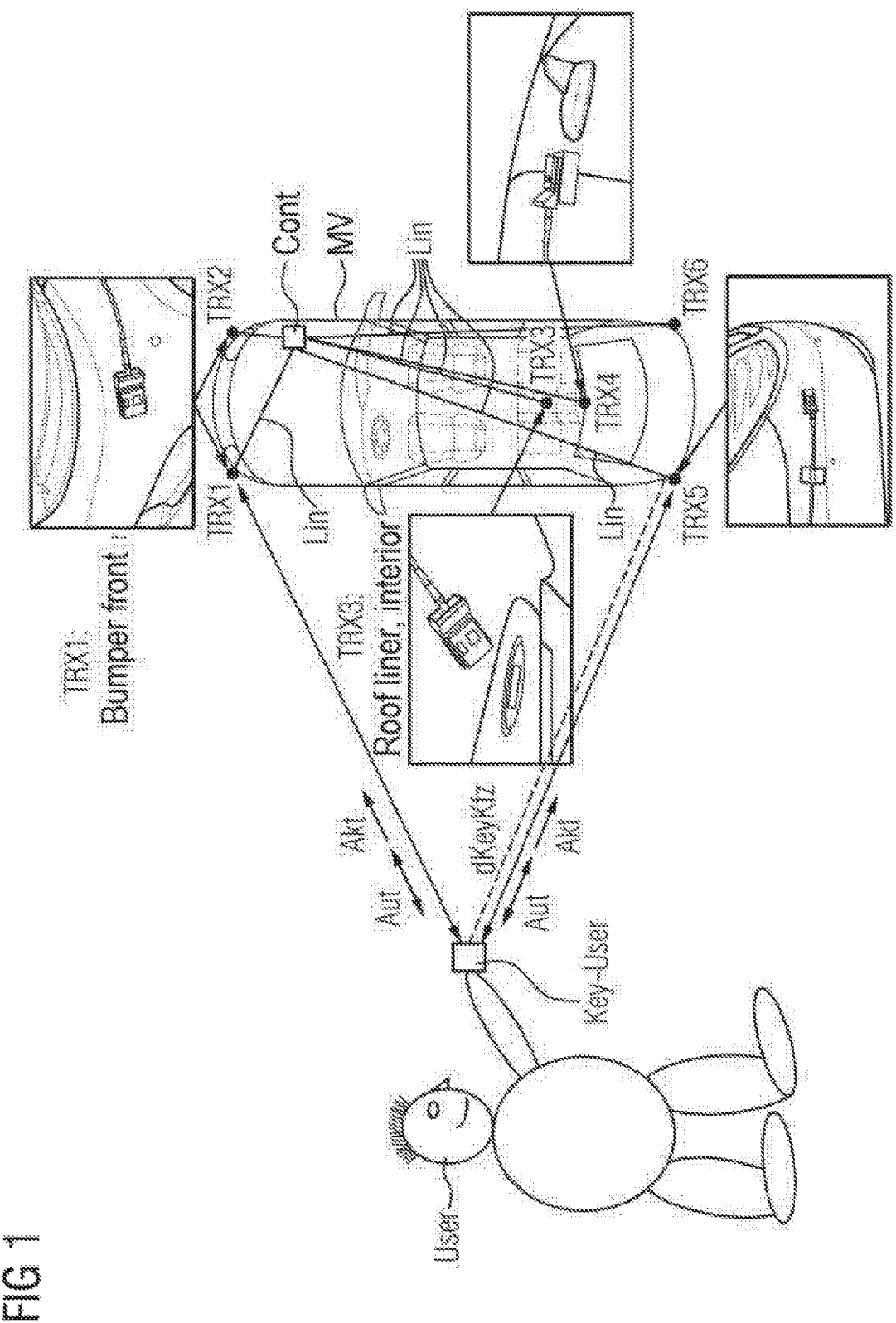
FIG. 1 is the activation of a function of a device by radio from a terminal (in particular radio key and/or card) of a user, FIG. 2 are device transceivers on a device installed with varying reference distance values relating to distances (here motor vehicle transceiver on a motor vehicle)

As one configuration of the invention, FIG. 1 shows an authentication Aut and an activation Akt for a function (e.g., open door, open trunk, or start motor vehicle, etc.) of a motor vehicle MV via radio (e.g., UWB and/or LF and/or RF) from a terminal key user Usr (e.g., a radio key and/or an access card, etc.) of a user Usr, wherein the terminal key Usr of the user Usr (automatically or after activation by the latter) communicates with one or several or all of the motor vehicle transceivers TRX1, TRX2, TRX3, TRX4, TRX5, TRX6 (e.g., respective modules with a transmitter and/or receiver—or with several transmitters and/or receivers, e.g., for USB, LF, RF, etc.) on a motor vehicle MV.

Transceivers TRX1, TRX2, TRX3, TRX4, TRX5, TRX6 are located on the motor vehicle MV, e.g., installed and/or mounted and/or welded and/or adhesively bonded and/or bolted, etc. For example, transceivers TRX1, TRX2 are here situated on the front bumper of the motor vehicle MV on the left or right. As shown, both are located outside on the motor vehicle MV. Transceivers TRX5, TRX6 are here situated on the rear bumper of the motor vehicle MV on the left or right, for example, and may also both also located outside on the motor vehicle MV. A transceiver TRX4 is located in a roof antenna module of the motor vehicle MV (e.g., here in the fin and/or under the roof). A transceiver TRX3 is located inside of the motor vehicle, e.g., in the roof liner.

The terminal key Usr (e.g., a radio key or access card, etc.) of the user Usr here communicates by radio with one or several or all (motor vehicle) transceivers TRX1, TRX2, TRX3, TRX4, TRX5, TRX6 of the motor vehicle MV (e.g., UWB, LF, RF), e.g., for authentication Aut and/or transmission of a command Act for implementing a function (e.g., open door (Dooropen), open trunk, or start motor vehicle) of the motor vehicle MV.

At least one controller Cont in the motor vehicle MV denoted in a simplified manner is used to check whether the terminal key-Usr (e.g., a radio key or access card) is authorized to command the motor vehicle MV with a function (e.g., open doors, open trunk or start motor vehicle, etc.) (Act), and/or whether a function (e.g., Dooropen) is to be implemented, if necessary among other things, based on the distance dKeyMV of the terminal key Usr from one or several of the transceivers TRX1, TRX2, TRX3, TRX4, TRX5, TRX6 of the motor vehicle MV, and/or whether the motor vehicle MV is to implement this function (e.g., Dooropen).

Figure 2:
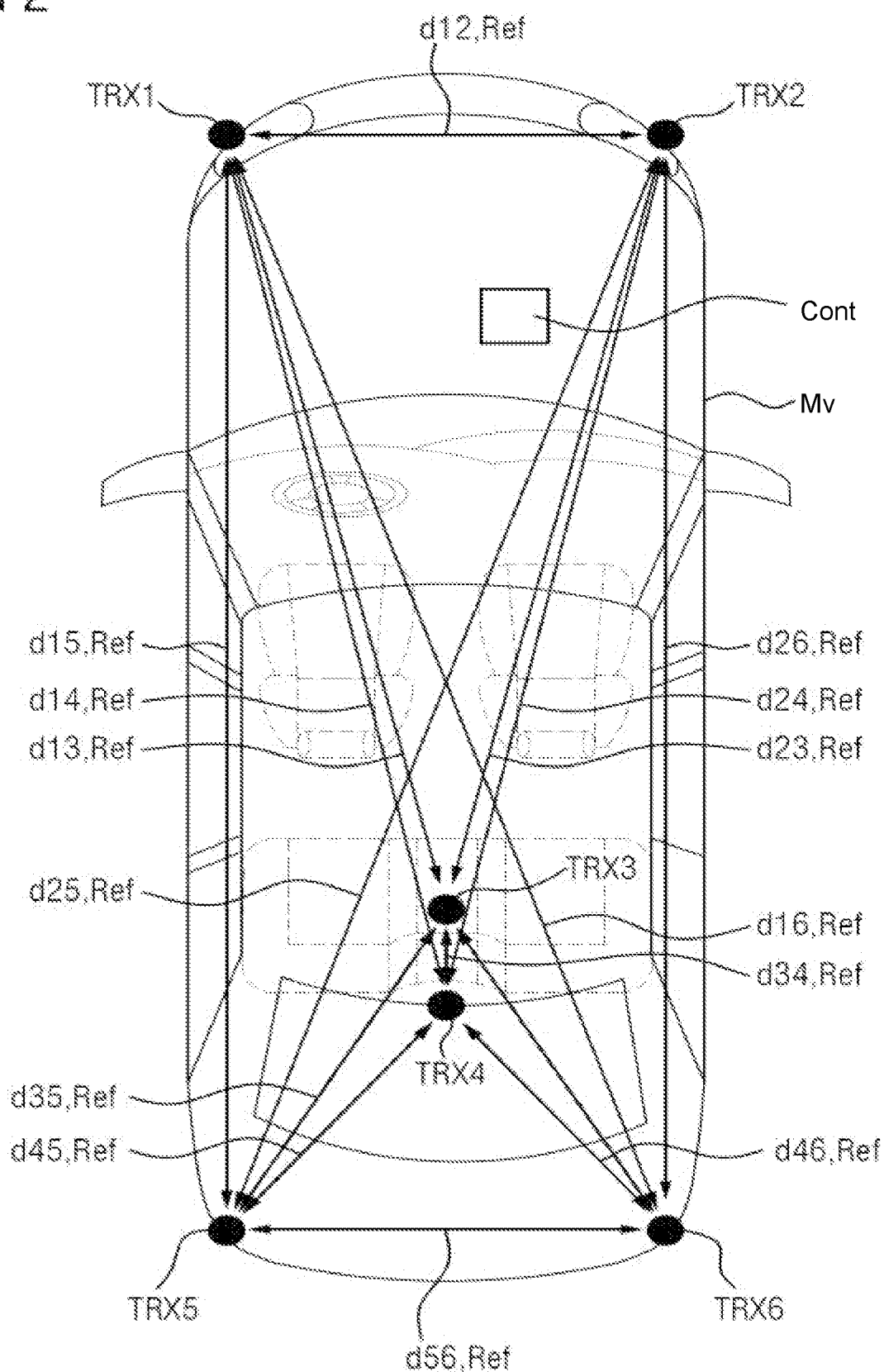
Figure 3:
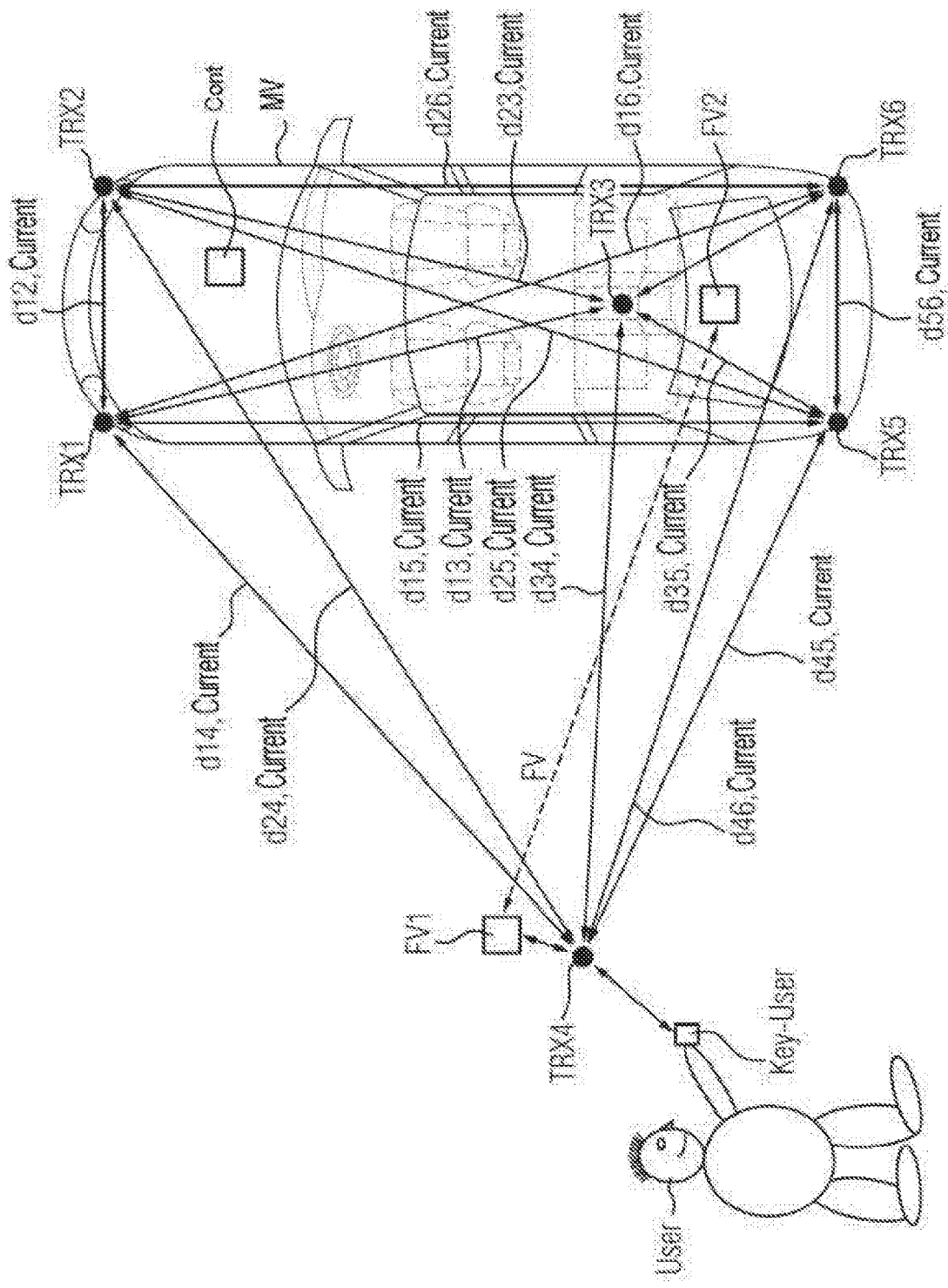
FIG. 3 is the motor vehicle transceiver on FIG. 2, where the position of a motor vehicle transceiver has changed by comparison to FIG. 2, FIG. 4 are vehicle transceivers and additional components communicating with each other via different radio systems and busses in a motor vehicle.

On FIG. 2 and FIG. 3, $d_{ij}$ (current $d_{ij,k\ current}$) represent distance values in the form of distances from a respective two of the motor vehicle transceivers $TRX_i$, $TRX_j$ (i, j=1 . . . 6, i.e., two other of the TRX1, TRX2, TRX3, TRX4, TRX5, TRX6 here). A respective one of the motor vehicle transceivers TRX1, TRX2, TRX3, TRX4, TRX5, TRX6 transmits (e.g., controlled by a controller Cont inside of it and/or in a controller Cont connected with it (Lin)) at least one query signal, e.g., periodically and/or as warranted, to which a respective response signal can be transmitted back, e.g., by all other motor vehicle transceivers (entirely/partially/modified/other), which allows the motor vehicle transceiver that transmits the query signal and/or a controller, e.g., by way of a timer, to determine the runtime, and thus potentially the distance to each of the other transceivers (as current distance values) from the difference between the query signal transmission time and response signal arrival time (and halving). There are numerous alternative ways to determine runtime, e.g., by transmitting a query signal with a time indication and running a comparison with its arrival time, and/or interleaving several queries and/or responses.

At least one controller Cont (separate and/or located in the motor vehicle transceivers TRX1, TRX2, TRX3, TRX4, TRX5, TRX6) here checks (aside from potential additional checks, such as authorization checks with codes and/or continuously used case-by-case codes and/or signal runtime measurements, etc.) a change in transceiver position by detecting changes in currently measured distance values $d_{ij,\ current}$; $t_{ij,\ current}$ relating to distances (and/or runtimes) of motor vehicle transceivers TRXi, TRXj (i, j=1 . . . 6, i.e., a respective two other of the here TRX1, TRX2, TRX3, TRX4, TRX5, TRX6) on a motor vehicle MV relative to each other, as compared with stored (older) reference distance values ($d_{ij,\ ref}$; $t_{ij,\ ref}$) relating to distances of the motor vehicle transceivers TRXi, TRXj (i, j=1 . . . 6, i.e., a respective two other of the here TRX1, TRX2, TRX3, TRX4, TRX5, TRX6) relative to each other, specifically with at least one distance determining device (e.g., with a runtime determining device, e.g., here integrated into the controller Cont as a program).

As a consequence, a change in position of a motor vehicle transceiver, e.g., that of motor vehicle transceiver TRX4 on FIG. 3, as compared with its position on FIG. 2 can be detected based upon varying radio signal runtimes of radio signals (and hence distances) from and/or to one or several or each of the additional motor vehicle transceivers TRX1, TRX2, TRX3, TRX5, TRX6 to or from the motor vehicle transceiver TRX4 whose position has changed, since the motor vehicle transceiver TRX4 is farther away from the additional motor vehicle transceivers TRX1, TRX2, TRX3, TRX4, TRX5, TRX6 in the situation on FIG. 3 than in the situation on FIG. 2, so that radio signals (e.g., transmitted for measuring the distances of the additional motor vehicle transceivers from each other (if necessary with authentication, etc.)) exhibit a respectively different runtime $t_{ij}$ (e.g., measured with timers and subtraction in TRX1 . . . TRX6 and/or Cont), and hence (since $d_{ij}=c(air)*t_{ij}$) a different measured current distance $d_{ij}$ on FIG. 3 than the reference distance (stored, e.g., stored in the Cont ex works and/or measured before the current distance) on FIG. 2.

The transceivers TRX1, TRX2, TRX3, TRX4, TRX5, TRX6 on the vehicle MV thus measure the distances between them via radio (e.g., controlled by a controller connected with them, e.g., by a LIN bus and/or controlled by controllers in the motor vehicle transceivers TRX1, TRX2, TRX3, TRX4, TRX5, TRX6), and thereby generate one or several (in comparison with (the) current older) reference profiles with reference distance values ($d_{ij,\ ref}$; $t_{ij,\ ref}$) and/or generate (continuously/case-by-case) a test profile with currently measured distance values $d_{ij,\ current}$; $t_{ij,\ current}$, so as to determine changes in the distance of motor vehicle transceivers TRX1, TRX2, TRX3, TRX4, TRX5, TRX6 relative to each other by comparing them.

Several examples for a configuration of the invention will be described below involving the check performed by a controller Cont to determine whether there was a change in distance values $d_{ij,\ current}$; $t_{ij,\ current}$ of (at least) one motor vehicle transceiver TRX4 relative to one or several or each of the additional motor vehicle transceivers TRX1, TRX2, TRX3, TRX5, TRX6 (as for TRX4 from FIG. 2 to FIG. 3), wherein a respective distance value $d_{ij}$ is the distance between a transceiver (also referred to as anchor) i and a transceiver j (e.g., distance measured by the transceiver i), and i,j here have the values i,j=1 . . . 6 (correspondingly other values given a higher or lower number of transceivers):

Arranged in a distance matrix D (I lines, j columns), for example, distance values look as follows (for a test distance matrix $D_{current}$ with currently measured distance values and/or for a matrix $D_{ref}$ with reference distance values:

$$D = \begin{pmatrix} 0 & d_{12} & d_{13} & \cdots & d_{1j} \\ d_{21} & 0 & d_{23} & \cdots & d_{2j} \\ d_{31} & d_{32} & 0 & \cdots & d_{3j} \\ \vdots & \vdots & \vdots & \ddots & \vdots \\ d_{i1} & d_{i2} & d_{i3} & \cdots & 0 \end{pmatrix}$$

i.e.:

$$D_{aktuell} = \begin{pmatrix} 0 & d_{12,aktuell} & d_{13,aktuell} & \cdots & d_{1j,aktuell} \\ d_{21,aktuell} & 0 & d_{23,aktuell} & \cdots & d_{2j,aktuell} \\ d_{31,aktuell} & d_{32,aktuell} & 0 & \cdots & d_{3j,aktuell} \\ \vdots & \vdots & \vdots & \ddots & \vdots \\ d_{i1,aktuell} & d_{i2,aktuell} & d_{i3,aktuell} & \cdots & 0 \end{pmatrix}$$

$$D_{Ref} = \begin{pmatrix} 0 & d_{12,Ref} & d_{13,Ref} & \cdots & d_{1j,Ref} \\ d_{21,Ref} & 0 & d_{23,Ref} & \cdots & d_{2j,Ref} \\ d_{31,Ref} & d_{32,Ref} & 0 & \cdots & d_{3j,Ref} \\ \vdots & \vdots & \vdots & \ddots & \vdots \\ d_{i1,Ref} & d_{i2,Ref} & d_{i3,Ref} & \cdots & 0 \end{pmatrix}$$

For example, such a distance matrix D can be square and/or (approximately) symmetrical ($d_{ij} \approx d_{ji}$); it can also be used for a plausibility check.

For example, the starting point for calculating a correlation value is the element-by-element comparison of the reference and test distance matrix, i.e. (e.g., via subtraction of the test distance matrix $D_{current}$ with measured, current distance values $d_{ij,\ current}$; $t_{ij,\ current}$ and the reference matrix $D_{ref}$ with stored reference distance values $d_{ij,\ ref}$; $t_{ij,\ ref}$) e.g., a comparison matrix V:

$$V = D_{current} - D_{ref}$$

With elements $v_{ij} = [d_{ij,current}] - [d_{ij,ref}]$

Possible (combinable) metrics for the correlation value k include:

The sum of square errors:

$$k = \sum_{i,j} v_{ij}^2$$

and/or

The frequency with which a threshold s of the elements $v_{ij}$ is dropped below, $k = |\{v_{ij}|v_{ij}>s\}|$ and/or The maximum value of elements $v_{ij}$:

$$k = \max_{i,j} v_{ij}$$

Signal runtimes can be correspondingly considered, in particular subtracted, in place of (matrices with) distances.

For example, configurations of the invention make it possible to generate a reference and test profile for a PASE system:

For example, the reference profile $D_{ref}$ (with reference distance values) is initiated one time during production of the vehicle (e.g., final test).

It can be identical for a specific vehicle platform (with identical installation sites), or be generated individually for a vehicle.

For example, the test profile $D_{current}$ (with current distance values) is generated in a timely manner in each authentication process (e.g., with integration into the communication sequence, e.g., when pulling on the door handle, and/or at the same time as an LF trigger).

For example, the test profile $D_{current}$ (with current distance values) can also be compared with previously measured profiles $D_{ref}$ (with reference distance values) (instead of with a profile generated by the manufacturer). In this case, the profile measured earlier would represent the reference profile for the comparison. For example, this can be advantageous for dynamically adjusting the system to changing environmental influences. The "reference profile" $D_{ref}$ (with reference distance values) could in this way be generated when locking the vehicle, and would thus encompass all environmental influences at this moment (e.g., garage walls). It is possible that these environmental influences will not change significantly up until opening.

For example, a profile detection for teaching motor vehicle transceivers TRX1, TRX2, TRX3, TRX4, TRX5, TRX6 for a PASE system can take place as follows according to configurations of the invention:

When installing or replacing motor vehicle transceivers TRX1, TRX2, TRX3, TRX4, TRX5, TRX6 (e.g., in a production environment or workshop), there might be a problem in allocating the motor vehicle transceivers TRX1, TRX2, TRX3, TRX4, TRX5, TRX6 reported to a bus to a (known) installation position, or in verifying a previously defined allocation.

For example, a current, measured profile $D_{current}$ (with current distance values) is used to resolve this problem, to compare it for all possible permutations of transceiver allocations with a previously determined (e.g., platform-specific) reference profile $D_{ref}$ (with reference distance values).

For example, the actually present installation situation is detected by evaluating the correlation value k, e.g., according to one or several of the variants mentioned above.

For example, a safe and efficient detection strategy can include previously known information and boundary conditions, e.g. distinguishable transceiver categories (e.g., transceivers in the interior space/exterior space).

In particular, for example, the feature of a UWB distance measurement that only essentially positive errors are generated (which can be ensured by calibrating the UWB transceivers) can be combined with the information about distances of the known installation positions: If a measured distance between two of the motor vehicle transceivers x (TRXx) and y (TRXy) is shorter than the distance between two installation sites i and j, the combination [i=x, j=y] or [i=y, j=x] can be precluded.

For example, this quality (positive errors only) can ultimately yield the strategy of giving more weight to distance measurements with a small measured value when making the decision than to measurements with large values (the latter could be diluted by multipath effects). As a consequence, small measured values would be more reliable than large ones.

For example, a bus attack for a PASE system can be detected as follows: for example, the system on FIG. 2 is initially designed for detecting a so-called "relay attack" and/or for detecting a radio path extension FV from the automobile MV to the key Key-usr.

For example, the counter is here based on the runtime measurement of the runtimes $t_{ij, current}$ between the key Key-usr and at least one vehicle transceiver TRX1, TRX2, TRX3, TRX4, TRX5, TRX6 (in the "worst-case" scenario, the key Key-usr only reaches one of the six vehicle transceivers TRX1, TRX2, TRX3, TRX4, TRX5, TRX6).

For example, as on FIG. 3, a bus attack is based upon a radio extension FV (with two denoted radio extension modules FV1, FV2 connected with each other via (mobile/WLAN/etc.) radio, etc., of which one communicates with the disassembled transceiver TRX4, for example, and/or one can be connected to the LIN bus of the MV, for example, etc.) of the LIN bus of a motor vehicle MV, which probably can be accessed given motor vehicle transceivers TRX1, TRX2, TRX3, TRX4, TRX5, TRX6 installed on the outside. It is here possible that the LIN bus and transceivers TRX1, TRX2, TRX3, TRX4, TRX5, TRX6 be secured (e.g., via cryptology) and not be changed by the attacker Usr.

An attacker Usr thus removes a transceiver TRX4 from the automobile and brings it in proximity to a key Key-usr. For example, the (LIN, etc.) bus communication with the vehicle MV is here kept intact by an extension (e.g., wired and/or radio).

For example, a UWB runtime measurement alone (without inventive configurations of the process of checking how transceiver distances change relative to each other) could determine a valid distance between the key Key-usr and vehicle transceiver; the attack would have been successful.

In order to detect the bus attack, the authentication sequence also incorporates a measurement of a test profile (e.g., with current distance values $d_{ij, current}$; e.g., from runtimes $t_{ij, current}$ of signals) and a comparison (Cont; V) with a reference profile (e.g., reference distance values $d_{ij, ref}$), and it is only decided to execute a command Act (e.g., open doors (Dooropen) or start engine) of a terminal Key-usr (e.g., a radio key or access card) of a user Usr if (potentially aside from other checks) no change in distance (as for TRX4 on FIG. 3 relative to FIG. 2) is determined.

For example, a system response (of a controller Cont of a motor vehicle MV) can be as follows:

Localization: For example, depending on the result or achieved correlation value k, one or more specific transceivers (TRX4 on FIG. 3) are disqualified in one configuration of the invention, e.g., these transceivers TRX4 are no longer used for communicating with a terminal Key-usr (e.g., key/card) and/or determining the distance dKeyMV of the terminal Key-usr to the motor vehicle MV), and/or a warning or corresponding quality value is output for the calculated position and/or a command Act is ignored.

PASE-RAD: If at least one specific correlation threshold (e.g., a threshold for at least one correlation value k or for several) is not exceeded, an attempted repetition is introduced or authorization is denied according to a configuration of the invention.

PASE Learning: In a configuration of the invention, for example, all possible correlation values are calculated via the permutation of possible transceiver positions, the installation position is determined through "maximum likelihood", and possible constellations are delimited, e.g., by weighting or checking the plausibility of measuring results (for example, short distances are trusted more, since UWB can be used to preclude negative errors in the measurement given a suitable TRX calibration).

For example, various embodiments allow the following:

Detection of changed anchor positions

Little or no additional hardware outlay

For example, configurations of the invention can be used and/or implemented for the following applications:

Localization (e.g., of a MV in a garage and/or an electric vehicle charging station)

Autonomous driving (with localization of infrastructure beacon)

Robotics (e.g., iRobot™=etc. lawnmowers, manufacturing automation)

Maintenance (plausibility check after replacement of individual motor vehicle transceivers TRX1, TRX2, TRX3, TRX4, TRX5, TRX6)

Calibration (accuracy improvement).

Some embodiments can be used in a motor vehicle, but also, for example, in fixed infrastructure beacons, such as in particular in a traffic light, traffic sign, etc., in particular if (e.g., in an intersection) equipped with UWB beacons (e.g., to check the constellation, or detect obstructions or objects), or for mobile infrastructure beacons, e.g., for construction site tours by means of UWB beacons (the beacon constellation can here be checked).

In order to send signals between the motor vehicle transceivers TRX1, TRX2, TRX3, TRX4, TRX5, TRX6 (and receiving the signals), whose runtimes $t_{ij,\,current}$ between a respective two of the motor vehicle transceivers TRX1, TRX2, TRX3, TRX4, TRX5, TRX6 can be determined, so as to determine current distances $d_{kj,\,current}$ between a respective two motor vehicle transceivers TRX1, TRX2, TRX3, TRX4, TRX5, TRX6, the motor vehicle transceivers TRX1, TRX2, TRX3, TRX4, TRX5, TRX6 can use transmitter and/or receiver units, for example, which they also use for communicating with a terminal/key/card Key-usr, or with other authentication codes and/or protocols, for example.

Figure 4:
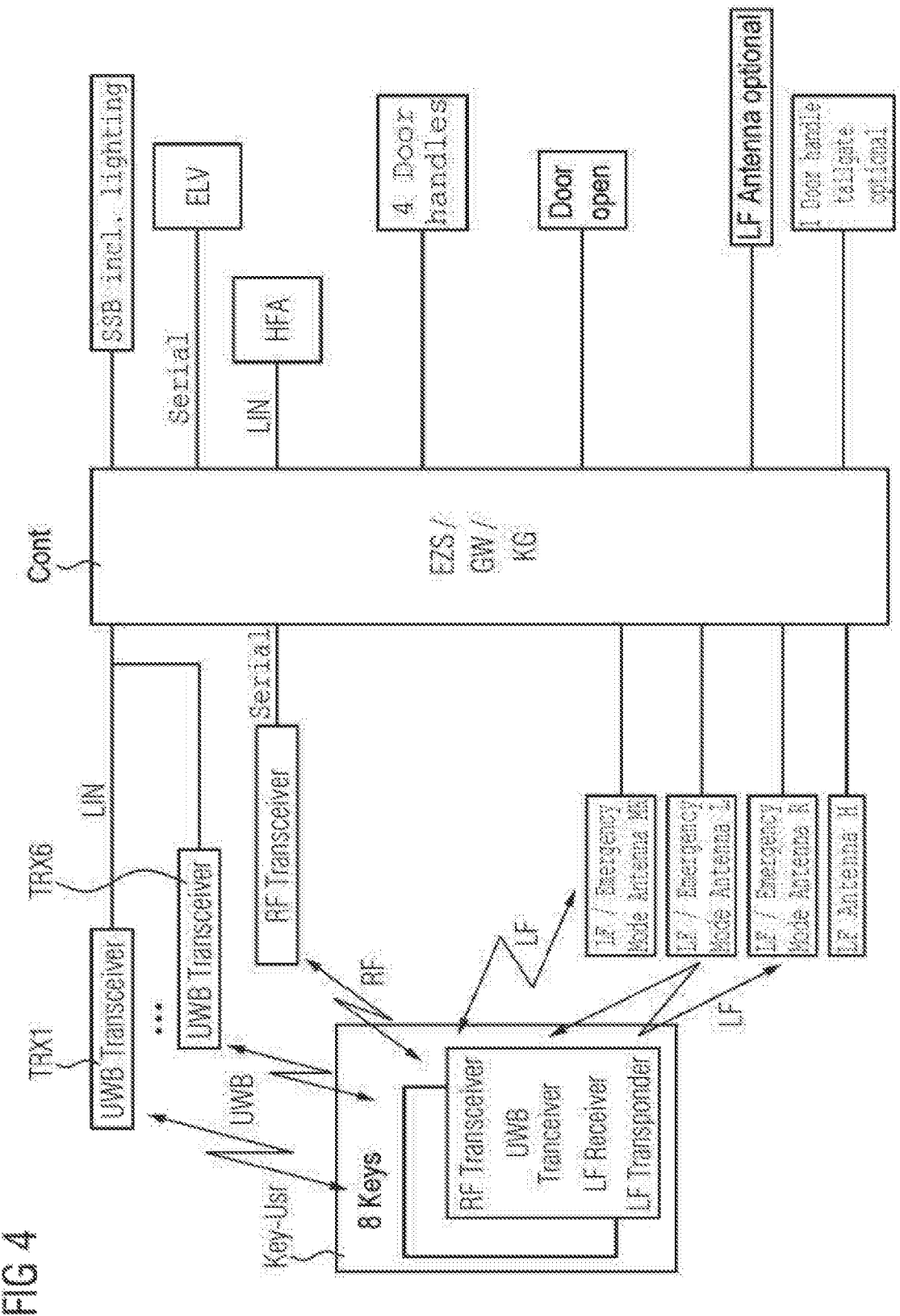

FIG. 4 shows motor vehicle transceivers TRX1, TRX2, TRX3, TRX4, TRX5, TRX6 and other components (gateway EZS/GW/KG, etc.) on a motor vehicle MV that communicate with each other by way of various radio systems (e.g., UWB, LF, HF (or RF or high frequency)) and buses (e.g., LIN, serial, CAN). A controller Cont receives and/or considers inputs from motor vehicle transceivers TRX1, TRX2, TRX3, TRX4, TRX5, TRX6 and/or other antennas and/or an SSB and/or door handles and/or LF antennas and/or a tailgate handle, for example.

Figure 5:
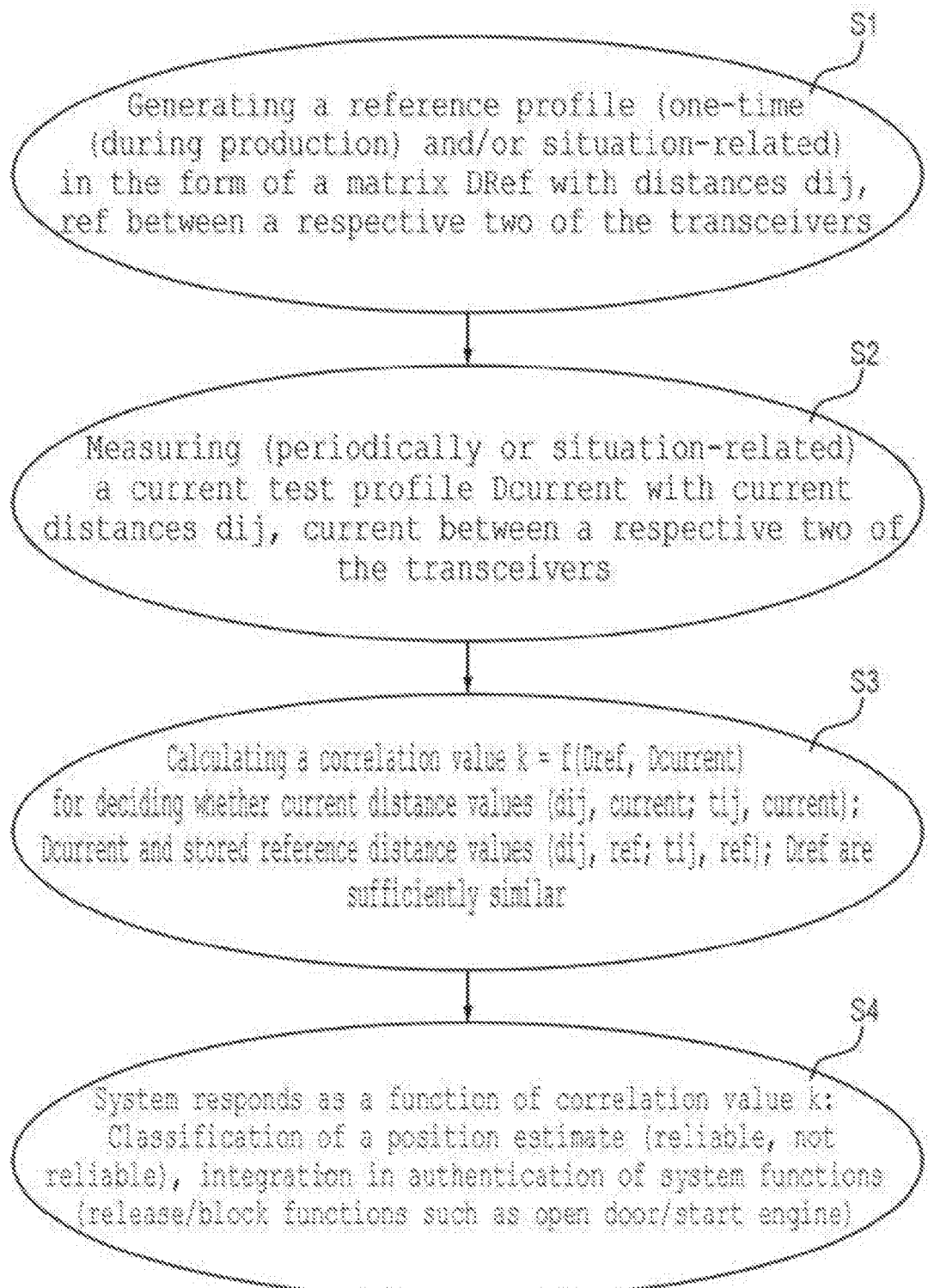
FIG. 5 is the sequence of a test to determine whether access to a function, e.g., opening the door or starting an engine of a motor vehicle, is to be granted by radio.

With respect to a configuration of the invention, FIG. 5 shows steps S1-S4 of a sequence for checking whether a terminal (e.g., a radio key or card) Key-usr is to be granted access by radio to a function (e.g., open door or start engine) of a motor vehicle MV (e.g., based upon its distance dKeyMV and/or an authentication and/or a command Act), e.g., whether a function (e.g., open door or start engine) is to be initiated by a controller Cont of the motor vehicle MV.

Step S1 involves generating a reference profile (e.g., one-time (during production) and/or, for example, situation-related) in the form of a matrix $D_{ref}$ with distances $d_{ij,\,ref}$ between a respective two of the motor vehicle transceivers TRX1, TRX2, TRX3, TRX4, TRX5, TRX6.

Step S2 involves measuring (periodically or situation-related) a current test profile $D_{current}$ with current distances $d_{ij,\,current}$ between a respective two of the transceivers.

Step S3 involves calculating at least one correlation value $k=f(D_{ref},\,D_{current})$ for deciding whether current distance values ($d_{ij,\,current}$; $t_{ij,\,current}$); $D_{current}$ and stored reference distance values ($d_{ij,\,ref}$; $t_{ij,\,ref}$); $D_{ref}$ are sufficiently similar.

Step S4 involves a system response taking place as a function of at least one correlation value k, e.g., a classification of a position estimate (reliable, not reliable) and/or integration into an authentication for system functions (e.g., release/block functions like open door (Dooropen)/engine start).

The invention claimed is:

1. A system for processing a remote request for an operation of a vehicle, the system comprising:
multiple vehicle-associated transceivers configured to be mounted in various positions around the vehicle;
a remote transceiver external to the vehicle and associated with a user key, the remote transceiver configured to transmit a remote request;
a memory storing reference distance values corresponding to reference distances between different transceiver pairs of the multiple vehicle-associated transceivers;
a controller programmed to:
analyze movements of the multiple vehicle-associated transceivers relative to each other, including:
measuring a current distance value corresponding to a respective current distance between each of the different transceiver pairs of the multiple vehicle-associated transceivers based at least in part on respective signal runtimes between each respective transceiver pair; and
for each different transceiver pair, determining a distance difference between the measured current distance value and the reference distance value for the respective transceiver pair;
determining a transceiver distance correlation metric based on the determined distance differences between the measured current distance values and reference distance values;
control a processing of the remote request based at least on the transceiver distance correlation metric.

2. The system according to claim 1, wherein at least one of the stored reference distance values is stored during the production of the vehicle, or measured before the current distance values.

3. The system according to claim 1, wherein the controller measures the current distance values for each of the different transceiver pairs periodically or at prescribed times or when a prescribed situation occurs.

4. The system according to claim 1, wherein the remote request comprises a request for opening a door or trunk lid of the vehicle or for starting up the vehicle.

5. The system according to claim 1, wherein the vehicle comprises a motor vehicle.

6. The system according to claim 1, wherein determining a transceiver distance correlation metric comprises calculating a correlation value representing a sum of squares of the distance differences determined for the different transceiver pairs; and
the controller is further programmed to compare the correlation value to a predetermined threshold value.

7. The system according to claim 1, comprising:
measuring a distance between the remote transceiver and at least one of the multiple vehicle-associated transceivers; and
controlling the processing of the remote request based at least on:
(a) the transceiver distance correlation metric, and
(b) the measured distance between the remote transceiver and the at least one of the multiple vehicle-associated transceivers.

8. The system according to claim 1, wherein controlling the processing of the remote request based at least on the transceiver distance correlation metric comprises executing a requested command identified in the remote request only if the transceiver distance correlation metric exceeds a predetermined threshold.

9. The system according to claim 1, comprising:
determining, based on the distance differences determined for each respective transceiver pair, a movement of a particular vehicle-associated transceiver of the multiple vehicle-associated transceivers relative to the other vehicle-associated transceivers; and disqualifying the particular vehicle-associated transceiver from communicating with the remote transceiver or from processing the remote request.

10. A method for processing a remote request for an operation of a vehicle having multiple vehicle-associated transceivers, the method comprising:

receiving the remote request at one of the multiple vehicle-associated transceivers from a remote transceiver provided at a mobile key device external to the vehicle, the remote request specifying an operation of the vehicle;

measuring current distance values representing distances between each different transceiver pair of the multiple vehicle-associated transceivers based at least on signal runtimes between each respective transceiver pair using a controller associated with the vehicle;

accessing, by the controller, stored reference distance values representing references distances between the different transceiver pairs of the multiple vehicle-associated transceivers;

determining, by the controller, a correlation measure between the current distance values and the reference distance values; and determining to execute or not execute the operation of the vehicle specified in the remote request based at least on the determined correlation measure between the current distance values and the reference distance values.

11. The method according to claim 10, wherein determining the correlation measure between the current distance values and the reference distance values comprises:

for each different transceiver pair of the multiple vehicle-associated transceivers, determining a distance difference between the current distance value and the reference distance value for the respective transceiver pair; and calculating, as the correlation measure, a sum of squares of the distance differences determined for the different transceiver pairs.

\* \* \* \* \*